Feb. 5, 1935.   H. N. OTT   1,990,389
HEADLIGHT FOR VEHICLES
Filed Dec. 1, 1931    2 Sheets-Sheet 1
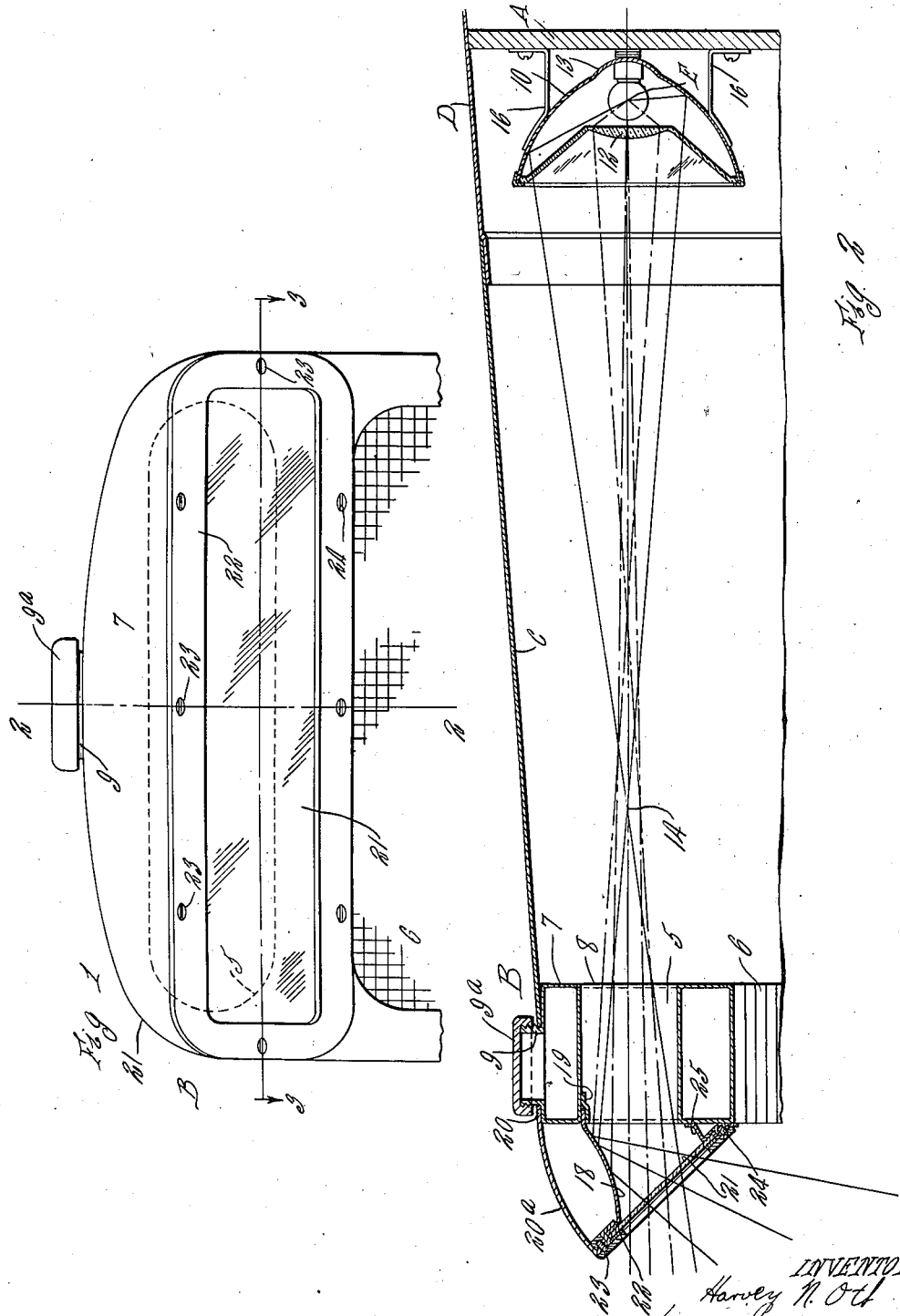

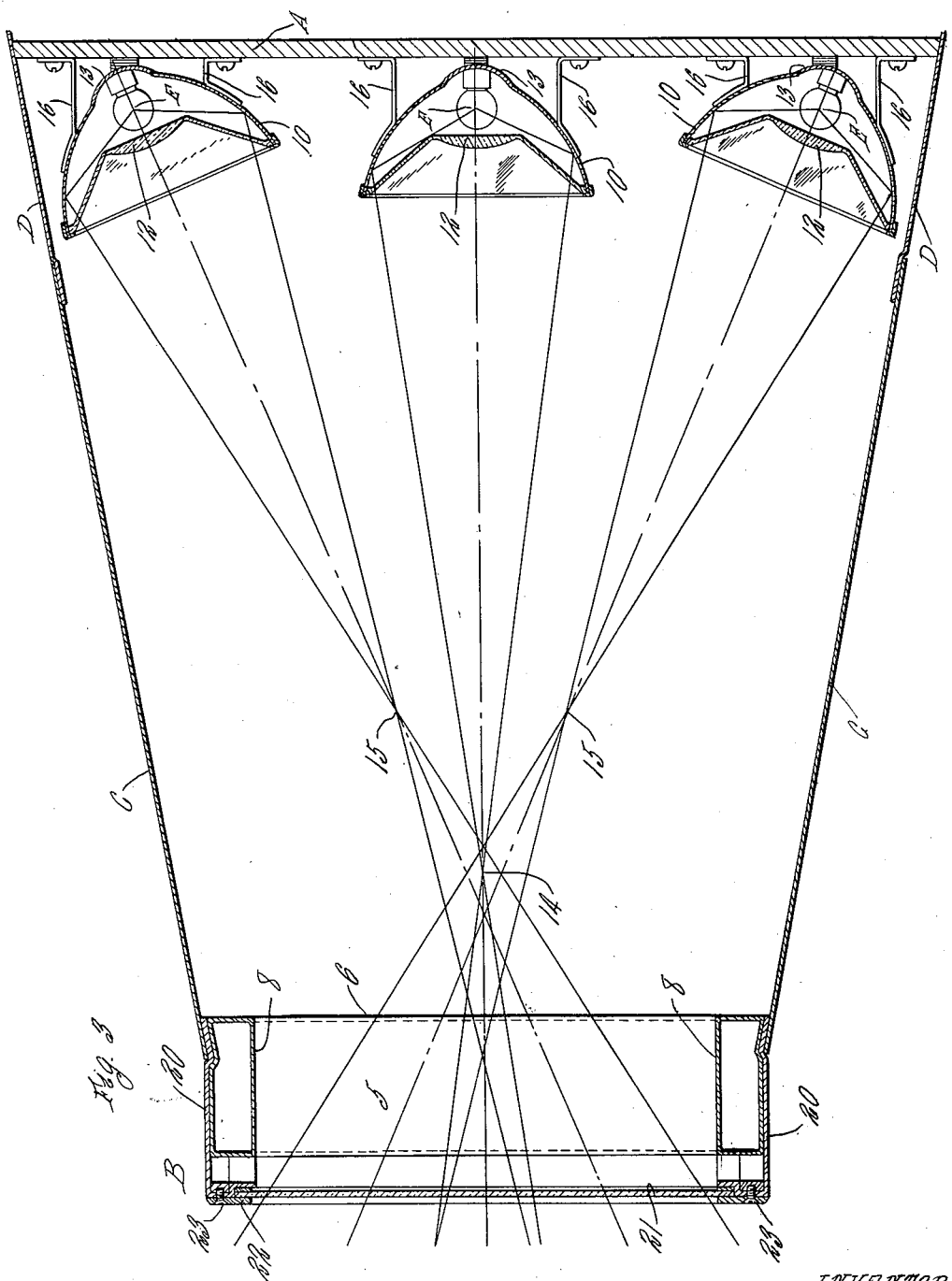

Patented Feb. 5, 1935

1,990,389

UNITED STATES PATENT OFFICE 1,990,389

HEADLIGHT FOR VEHICLES

Harvey N. Ott, Buffalo, N. Y.

Application December 1, 1931, Serial No. 578,257

3 Claims. (Cl. 240—8.11)

This invention relates to headlights for automobiles or other vehicles.

The objects of the invention are to provide a headlight which is so arranged with reference to an automobile as to project a pencil of light of sufficient width to properly illuminate the road ahead of the automobile without reflecting any rays upwardly to produce objectionable glare; also to provide an improved construction by means of which the headlights may be enclosed in the engine compartment of an automobile; also to provide a construction in which a plurality of light sources are located under cover at a distance from a light outlet and in which the light from the several sources is brought together into a pencil which diverges in a horizontal direction; also to provide a construction in which the rays of light from the light source or sources are brought to conjugate foci adjacent to the opening in the front wall of the engine compartment, so that an opening of small size may be employed; also to provide a construction of this kind in which a plurality of lights or lamps are used which are arranged to project their pencils of light to cross, so that the desired width or spread of the pencil can be obtained after the same passes through a relatively small opening; also to improve the construction of headlights for automobiles in other respects hereinafter specified.

In the accompanying drawings:

Fig. 1 is a front elevation of the upper portion of the engine compartment of an automobile;

Fig. 2 is a central sectional elevation thereof, on line 2—2, Fig. 1;

Fig. 3 is a sectional plan view thereof, on line 3—3, Fig. 1.

Heretofore headlights have been arranged in the front portion of an automobile at opposite sides of the front part of the engine compartment and while efforts have been made to prevent glare from headlights of this kind, yet if the headlights are even slightly out of adjustment, a very objectionable and dangerous glare results. In accordance with this invention, the headlights are arranged within a suitable enclosure or under cover, with the light sources at a considerable distance from the opening through which the light emerges. Any suitable enclosure or cover of this kind may be obtained, and since in an automobile there is generally considerable unobstructed space between the motor or engine and the top of the hood, I prefer to place the headlights in this engine or motor compartment, and preferably in the rear portion of this compartment, and project their light through an aperture or slot in the front wall of the engine compartment. Because of the distance between the light source and the slot through which the light passes, even a considerable displacement of the light source out of its proper focused position will not cause the rays from the light to pass upwardly at such an angle as to produce glare, thus providing positive prevention of glare.

In addition to avoiding glare, the arrangement of the headlights in the engine compartment also protects the headlights from damage and eliminates entirely the resistance of the headlights to movement through the air, thus making possible a more complete streamlining of the vehicle body.

In the accompanying drawings is shown an embodiment of my invention, but it will be understood that this is only for purposes of illustration, since my invention may be otherwise applied to automobiles.

In the accompanying drawings, A represents a dash or transverse wall or partition of the rear portion of the engine compartment of an automobile or other engine driven vehicle, and B represents the front wall of the compartment, which in the case of water cooled cars is usually formed by means of a radiator for cooling circulating liquid, and which in air cooled cars may be of other form. The space between the dash and the front wall is usually enclosed by means of a hood, generally including a hinged or removable hood portion C and a cowl D. The front wall B is preferably provided at the upper portion thereof with an aperture or slot 5, through which light may pass from one or more light sources E located in the rear portion of the engine compartment. The light sources E may be arranged approximately in the same horizontal planes as the opening 5 in the front wall or may be located slightly above this plane.

In practically all automobiles now constructed, there is ample space in the upper portion of the engine compartment, so that light rays can pass from the light source or sources E unobstructed through the opening 5. This opening is preferably as wide as practical and comparatively small in a vertical direction, thus forming a narrow slot-like opening through which a pencil of light may pass so as to spread out to the desired degree toward opposite sides of the road ahead of the vehicle. Because of the distance between the light source E from the opening 5, it will be obvious that the prevention of glare is greatly facilitated by the arrangement described.

The opening 5 in the front wall of the engine compartment may be provided in any suitable or desired manner. In the construction shown, the opening is formed by constructing the upper water tank of the radiator in two parts, the lower portion 6 being connected with the upper portion 7 by means of columns 8 arranged at opposite sides of the opening 5, as clearly shown in Fig. 3. In this manner, water may be admitted to the upper tank of the radiator by means of the usual short inlet pipe or duct 9 closed by means of a cap 9a. Any other means for forming an aperture in the front wall of the engine compartment may be used.

The light sources E are preferably arranged within the reflectors 10 which may be of any usual or suitable construction, but which are preferably such as to bring the light to a focus somewhere adjacent to the slot or opening 5, for example, within the engine compartment. Reflectors of ellipsoid form may, for example, be used for this purpose. The light passing forwardly from the light sources E may be similarly focused by means of a lens 12 of any suitable or desired construction. When such lenses are used, it is preferable to make the portions of the reflectors in back of these lenses of spheroidal form as indicated at 13, the light source E being located in the center of curvature of the spheroidal portion of the reflector, so that any light striking the portion 13 will be reflected back to the light source.

By this arrangement, it is possible to have the light pass through a relatively small opening and still have the light spread over a relatively large area. In order to provide a broad pencil of light, three lamps are employed as shown in the drawings. The middle light may be constructed to bring the rays to a focus at 14, while the other two lamps have their focal points at 15 and are arranged so that the light rays from these lamps cross so that the lamp on the right hand side of the vehicle throws its light to the left side of the road. The lines on Fig. 3 indicate the direction of the rays of light to form a wide pencil of light passing through the opening 5.

The lamps may be secured in the rear portion of the engine compartment in any suitable or desired manner, for example, by means of brackets 16 having their front ends secured to the reflectors 10 and their rear ends to the dash A. Any other means for securing the lamps on the engine compartment may, however, be used if desired.

The structure thus far described would project a pencil of light forwardly from the vehicle in such a manner that the portion of the road immediately in front of the vehicle would be left unilluminated. In order to illuminate this portion of the road, I preferably reflect light from the upper portion of the pencil downwardly to illuminate this portion of the road, thereby converting to a useful purpose that portion of the light which might otherwise cause a glare.

In the construction shown for this purpose, a convex reflector 18 is preferably provided in front of the opening 5 in the front wall B, the curvature of this reflector being such that rays of light striking it are reflected downwardly as indicated in Fig. 2. Any means for securing this reflector in place may be provided, the reflector shown being clamped at its rear edge on the outer portion of the upper tank 7, for example, between the bottom wall of this tank and a sheet metal strip 19 secured to this tank, and its front edge may be secured in a protecting shield or visor 20a extending forwardly from the front wall B, and which may be a part of the shell or part 20 surrounding and confining the radiator.

A protecting plate of glass or other transparent material is preferably arranged across the opening 5 in front of the reflector 18. A glass plate 21 is shown in the construction illustrated, which is secured in place by means of a frame 22 held by screws 23 passing through the frame 22 and into the front face of the visor 20a, and other screws 24 pass through the lower portion of the frame and into a securing strip 25 which may be rigidly secured to the lower tank 6. Any other means for reflecting upwardly directed rays downwardly and for securing a transparent plate in front of the reflector 18 and opening 5 may be provided if desired.

By means of the construction described, the entire light necessary for adequate illumination of the road ahead of a vehicle may pass through a relatively small opening in the front of the engine compartment. In most automobiles, the rear portion of the engine compartment is considerably wider than the front portion, and consequently, by spacing two lamps near opposite sides of the rear portion of the engine space, and by directing the light from these lamps so as to cross toward opposite sides of the opening, a wide pencil of light may pass out of this opening, particularly, if the rays from each lamp are brought to a conjugate focus near the opening, or preferably slightly in rear thereof. The freedom from glare resulting from the use of this construction is due not only to the accurate control of the light which can be had by reason of the distance between the lamps and the opening 5, but also due to the fact that this opening 5 will be located at a higher elevation than headlights ordinarily used, so that the main direction of the light rays will be forwardly and downwardly. Consequently, upwardly projecting rays and the glare resulting therefrom can be entirely eliminated by the use of this arrangement. Furthermore, the lamps in the construction shown, are located where they are entirely protected against accidental displacement out of their correct positions, and by placing these headlights under the hood, the air resistance of the vehicle is correspondingly reduced.

I claim as my invention:

1. In an automobile, an enclosing engine hood defined at its front end by a radiator and at its rear end by an approximately vertical wall, said radiator having an aperture through the upper portion thereof and extending for the major portion of the width of said radiator, the space in the upper part of said hood to the rear of said aperture being unobstructed, a plurality of light sources in the upper part of the space of said hood, supported adjacent said rear wall including one adjacent each side of said space, means associated with each light for directing substantially all of the light rays therefrom as a converging pencil to an approximate focus disposed slightly to the rear of the front face of said radiator at the aperture, so as to leave said radiator as a diverging pencil, and means disposed in the path of the upwardly inclined rays of said diverging pencil leaving said radiator for reflecting those upwardly inclined rays downwardly and forwardly.

2. In an automobile, an enclosing engine hood defined at its front end by a radiator and at its rear end by an approximately vertical wall, said radiator having an aperture through the upper portion thereof and extending for the major portion of the width of said radiator, the space in the upper part of said hood to the rear of said aperture being unobstructed, a plurality of light sources in the upper part of the space of said hood, supported adjacent said rear wall including one adjacent each side of said space, means associated with each light for directing substantially all of the light rays therefrom as a converging pencil to an approximate focus disposed slightly to the rear of the front face of said radiator at the aperture, so as to leave said radiator as a diverging pencil, and a convex reflector disposed in the path of the upwardly inclined rays of light of said diverging pencil which leaves said radiator, for reflecting such upwardly inclined rays downwardly at different inclinations to the front of said radiator, whereby substantially all the rays of light leaving said radiator will be directed horizontally or downwardly, and forwardly.

3. In a motor vehicle, a motor enclosing hood defined at its forward end by a vertical radiator and at its rear end by an approximately vertical wall, said radiator having a passage from face to face through the upper portion thereof and horizontally broad with respect to its height, a plurality of sources of light arranged within said hood and arranged adjacent the rear wall thereof, including one source adjacent each side of the hood and one in between, means associated with each of said sources of light for directing substantially all of the rays of light therefrom as a converging pencil to a focus within said hood and toward said passage, so that the light leaving said passage will leave as a diverging pencil, the space within said hood in the path of said light pencils being unobstructed, and means in front of said passage in the path of all of the upwardly inclined rays of said diverging pencil for directing downwardly and forwardly all of said upwardly inclined rays of said diverging pencil, whereby substantially all the rays of light from said sources will be utilized in illuminating the roadway, and glare to drivers of approaching vehicles will be substantially prevented.

HARVEY N. OTT.